US005780306A

United States Patent [19]

Schels et al.

[11] Patent Number: 5,780,306

[45] Date of Patent: Jul. 14, 1998

[54] METHOD AND SYSTEM FOR MIXING LIQUIDS

[75] Inventors: Hans Schels, Munich; Karl-Heinz Mann, Weilheim; Horst Menzler, Bernried; Leonhard Geissler, Tutzing; Georg Kuffer, Furh, all of Germany

[73] Assignee: Boehringer Mannheim GmbH, Mannheim, Germany

[21] Appl. No.: 744,506

[22] Filed: Nov. 7, 1996

Related U.S. Application Data

[63] Continuation of Ser. No. 310,021, Sep. 21, 1994, abandoned.

[30] Foreign Application Priority Data

Sep. 21, 1993 [DE] Germany ........................ 43 31 997.1

[51] Int. Cl.[6] ........................ G01N 1/10

[52] U.S. Cl. ........................ 436/179; 436/54; 436/174; 422/82.01; 422/82.02; 422/106; 73/864.22; 73/864.33; 73/864.24; 73/304 R; 73/304 C; 366/101; 366/107

[58] Field of Search ........................ 436/54, 174, 179; 422/82.01, 82.02, 106; 73/864.22, 864.33, 864.24, 304 R, 304 C; 366/101, 107

[56] References Cited

U.S. PATENT DOCUMENTS

| | | | |
|---|---|---|---|
| 4,326,851 | 4/1982 | Bello | 23/230 R |
| 4,448,752 | 5/1984 | Banno et al. | 422/81 |
| 4,615,225 | 10/1986 | Sainz | 73/864.33 |
| 4,730,631 | 3/1988 | Schwartz | 134/155 |
| 4,736,638 | 4/1988 | Okawa | 73/864.24 |
| 4,794,085 | 12/1988 | Jessop et al. | 436/54 |
| 4,815,978 | 3/1989 | Mazza et al. | 422/100 |
| 4,830,832 | 5/1989 | Arpagaus et al. | 422/65 |
| 4,844,870 | 7/1989 | Rasmussen et al. | 422/68 |
| 4,871,682 | 10/1989 | Mazza | 436/179 |
| 4,944,922 | 7/1990 | Hayashi | 422/100 |
| 5,013,529 | 5/1991 | Itoh | 422/100 |
| 5,027,075 | 6/1991 | Harding, Jr. | 422/106 |
| 5,045,286 | 9/1991 | Kitajima et al. | 73/304 C |
| 5,057,823 | 10/1991 | Dyer et al. | 73/864.24 |
| 5,141,871 | 8/1992 | Kureshy et al. | 73/864.24 |
| 5,143,849 | 9/1992 | Barry et al. | 436/54 |
| 5,262,731 | 11/1993 | Mizoguchi | 73/864.24 |
| 5,304,347 | 4/1994 | Mann et al. | 422/67 |
| 5,463,228 | 10/1995 | Krause | 250/577 |
| 5,463,895 | 11/1995 | Brentz | 73/61.71 |

FOREIGN PATENT DOCUMENTS

| | | |
|---|---|---|
| 0 355 791 | 2/1990 | European Pat. Off. . |
| 0 164 679 | 7/1992 | European Pat. Off. . |

OTHER PUBLICATIONS

International Publication No. WO 85/03571 published Aug. 15, 1985.

*Primary Examiner*—Jill Warden
*Assistant Examiner*—Sharidan Carrillo
*Attorney, Agent, or Firm*—Nikaido, Marmelstein, Murray & Oram LLP

[57] ABSTRACT

The invention relates to a system for mixing a liquid with another liquid or a solid material by blowing a gas onto the surface of the liquid. The invention further relates to a system for implementing said method. Gas is blown onto the surface of the liquid from a distance which can be adjusted by determining the level of the liquid. A system of the invention, hence, comprises a device for blowing a gas onto the surface of a liquid and a device for detecting the level of a liquid.

9 Claims, 3 Drawing Sheets

METHOD AND SYSTEM FOR MIXING LIQUIDS

This application is a continuation of application Ser. No. 08/310,021 filed Sep. 21, 1994 now abandoned.

BACKGROUND OF THE INVENTION

1. Field of the Invention

The invention relates to a method for mixing a liquid with another liquid or a solid material by blowing air onto the surface of the liquid and a system for implementing said method.

Chemical and medical analyses are frequently carried out with devices, which allow rapid, selected, and uniform treatment of a plurality of samples. As opposed to manual procedures, this does not only decrease costs, but also improves reliability and accuracy of the analyses.

2. Description of the Related Art

Numerous currently available medical analyzers are known as discrete analyzers where each analysis is carried out in a separate reaction vessel. In the analysis, each individual vessel is subject to a plurality of operations. The vessels are transported through the analyzer system, substances are added or removed, the contents of the vessels is mixed and subject to analytical procedures such as photometric or potentiometric measurements.

Each of these steps involves numerous problems. Particularly the steps of adding, removing and mixing liquids, commonly referred to as liquid handling, involve various problems despite their simplicity. One predominant problem which affects the accuracy of the analysis is known as carry-over. If a pipette or a stirrer is immersed into the reaction vessel during liquid handling, numerous other measures are necessary to avoid analysis liquid from being transferred from one vessel to another vessel. In order to avoid this carry-over, numerous proposals have been made to carry out the mixing of the reaction components without contacting the reaction liquid.

In the so-called vortex principle, the analysis vessel is placed into a chamber where the reaction liquid is mixed by agitation. This procedure, however, also requires additional and time-consuming conveying steps.

In another procedure, the analysis vessels is coupled to an ultrasonic source where the contents is then mixed by exposing it to ultrasonics. However, this method does frequently not lead to a complete mixing of the mixture and, moreover, has the drawback of destroying any substances, especially larger organic molecules.

In patent application WO 85/03571, a method of mixing is described where liquids are mixed in an analysis vessel by means of blowing air onto the liquids. FIG. 10 of this application shows that a nozzle is disposed above the edge of the vessel. Loss of liquid due to the spinning which is generated by the beam of air is avoided by setting a defined liquid level. A disadvantage of this method is that it requires certain conditions in order to ensure a defined liquid level.

SUMMARY OF THE INVENTION

An object of the invention was to propose a method and a system for mixing a liquid which is free of carry-over and allows rapid, effective, and reliable mixing of the liquid. It was a particular object of the invention to propose a method where liquid can be rapidly and largely completely mixed in a vessel even when different liquid levels are present. To ensure a uniform quality of the analysis, it was another object of the invention to provide a method to ensure good mixing independent of the liquid volume and the shape of the vessel.

This object is accomplished by a method for mixing a liquid with at least another liquid or with at least another solid material in a vessel which can be accessed through an opening using at least one beam of gas emitted from a mixing element; said method comprising the following steps:

moving the mixing element in direction toward the liquid surface detecting the liquid surface in that the mixing element is brought into contact with the liquid moving the mixing element away from the liquid surface by a predetermined distance blowing gas from the mixing element onto the liquid surface so that the liquid is set in motion.

Subject matter of the invention is also a system for mixing a liquid with at least one other liquid or at least one solid material. Said system comprises a vessel containing the substances to be mixed, a mixing element, a detection device, a device for moving the mixing element, and a control unit.

If all conditions of the method of the invention are observed, rapid mixing is possible without substantially contaminating the mixing element or spinning liquid out of the vessel. In order to achieve these favorable properties, it is essential that the lowering of the nozzle be controlled by a detection device and an optimal distance between nozzle and liquid surface be maintained.

However, the process of invention does not refer exclusively to mixing liquids in clinical analyzers. When analyzer systems are used, the liquids to be mixed are usually contained in cylindrical vessels with a round or square-like cross section with the top being open.

Purpose of the invention is to achieve mixing of a liquid with at least another liquid or at least one solid material. Liquids as understood in this sense are analysis samples or reagent solutions as well as washing and auxiliary solutions. Sample solutions include liquids such as water samples, urine, blood, saliva and the like. When the liquids are mixed, interfaces must not necessarily be present. Mixing may also be desired when liquids which can usually not be mixed together are added into a common vessel by successive pipetting and the addition does not yet lead to a complete mixing. When a liquid is mixed with a solid material, it is usually desired that the solid material be completely dissolved in the liquid.

However, the scope of this invention encompasses also processes where a solid material is not dissolved in the liquid, but only dispersed or suspended. This can be important, for example, when a reaction partner is to be mobilized on a solid carrier and a liquid is to be brought in complete contact with the reaction partner.

In the method of the invention, a mixing element from which a gas beam emerges is moved toward the surface of the liquid in the analysis vessel. Advantageously, the gas already emerges from the mixing element during the motion. For reasons of costs, the gas used is usually air. In special applications where the contents of the vessel must be protected from oxidation, for example, it is also possible to use other gases such as inert gases.

While the mixing element is moving, it is detected whether or not the mixing element has contacted the surface of the liquid. Detection can be carried out, for example, by means of an optical system from outside the reaction vessel.

It is, however, also possible to carry out the detection inside the vessel. In a particularly advantageous manner, the mixing element can be mechanically coupled to a detection device. This procedure is generally referred to as liquid level detection.

U.S. Pat. No. 5,049,826 describes such a system for liquid level detection which is based on resistance measuring. In this literature reference, two electrically opposed, isolated poles are moved toward the surface of a liquid. A decrease of the resistance between the two poles indicates immersion into the liquid. Measurement arrangements which are based on capacitance measuring are described in EP-A-O 355 791, U.S. Pat. No. 4,736,638, U.S. Pat. No. 4,818,492, EP-A-O 164 679 and German patent application with the file reference P 4203638.0. Particularly the latter detection device is advantageous for use in the method of the invention as it employs an additional compensation electrode which significantly improves the signal/noise ratio in addition to the two signal electrodes already present. The complete contents of German patent application with the file reference P 4203638.0 is herewith incorporated in this application by reference.

The invention makes use of the various liquid level detection methods to add another area of application to the field of mixing liquids, which is blowing air onto the surface of the liquid and improve the performance of such a procedure. In accordance with the invention, this is achieved by coupling a mixing element to a detection device.

As soon as contact with the liquid has been detected, the mixing element is moved away from the liquid in accordance with the invention. If detection device and mixing element are mechanically attached to each other, while being vertically displaced, this displacement can be used to control the distance of the mixing device from the surface of the liquid. In this case it is not absolutely necessary to move the mixing element away from the surface.

The optimal distance between the gas outlet opening of the mixing element and the surface of the liquid in accordance with the invention is set between 3 and 6 mm. However, experiments have also shown that gas flow, distance from the surface and the angle at which air is blown onto the surface must be adjusted to one another. If an excessively strong gas flow is blown onto the surface from too small a distance, liquid may be wasted by splashing, which in turn may also cause contamination. If, however, an excessively large distance is selected for a certain volume flow, the energy transfer of the gas onto the liquid may be relatively small which in turn increases the time period required for thorough mixing. Other factors to be taken into consideration are size and shape of the vessel, shape of the mixing element, and the various nozzles of the mixing element.

In a preferred manner, the vessels are not completely filled with liquid instead a space of several millimeters up to a few centimeters is left at the edge. If a mixing element is placed into the vessel, the resulting reduced volume inside the vessel will produce a backup when the gas flow is active and, hence, reduce waste of liquid by splashing.

The one or several gas beams emerging from the mixing element can be directed onto the surface of the liquid in various manners. Examples of the various possibilities are now described with reference to one single beam of gas. The gas beam may be radially displaced with respect to the axis of the vessel and may impinge on the liquid surface at a point between vessel axis and vessel wall. It must not necessarily arrive directly on the surface of the liquid, but can also be directed at a flat angle onto the vessel wall from where it indirectly impinges onto the part of the liquid surface which is close to the wall. The gas beam may be also directed such that the emerging gas executes a rotational movement around the axis of the vessel. In such an arrangement, the areas of the liquid which are close to the surface are also made to circulate which also directly causes lower liquid layers to be moved. This, in turn, results in a more rapid mixing.

The invention also encompasses a process for mixing a liquid with at least one other liquid or at least one solid material in a vessel which can be accessed through at least one opening using at least one gas beam emerging from the mixing element. Said process comprises the following steps:

- moving the mixing element in direction toward a liquid surface
- detecting the distance between mixing element and liquid surface
- terminating the movement of the mixing element when a preset distance between mixing element and liquid surface has been reached
- blowing a gas onto the surface of the liquid to cause the liquid to move.

In the variant of the method in accordance with the invention which is described here, the mixing element is not lowered onto the surface of the liquid. The distance from which gas is blown onto the surface is a result of a contact-free measurement.

Contact-free measuring of the distance between liquid surface and mixing element can be achieved in an optical procedure, for example. Most analysis vessels are made of an optically transparent material as the analysis solutions are usually subject to optical measurement. In such cases, it is necessary to direct a light beam onto an arrangement in which a mixing element is located above the surface of the liquid. Once the light has passed, the vessel an image is produced on an optical sensor, for example an optical array.

The invention further comprises a method of mixing a liquid with at least one other liquid or at least one solid material in a vessel which can be accessed through an opening using at least one gas beam emerging from a mixing element. Said method comprises the following steps:

- moving the mixing element in direction toward the liquid surface
- detecting a contact between the mixing element and an interface
- blowing a gas in direction toward the liquid surface to displace foam or substances which may be present on the liquid
- moving the mixing element in direction toward the liquid surface
- detecting a contact between the mixing element and the liquid surface
- moving the mixing element away from the liquid surface by a given distance
- blowing a gas from the mixing element onto the liquid surface to cause the liquid to move.

In numerous analysis procedures which are used in the practice, a layer of foam is produced on the liquid. Liquid level detection will already indicate contact with the liquid if, in fact, only foam has been contacted. This does not ensure that an ideal distance between air nozzle and liquid is maintained. If the mixing procedure is controlled as described above, the needle will be retracted by thickness of the foam layer which results an unnecessary prolongation of the mixing time. The invention circumvents this problem by first detecting the foam layer with one of the described methods and then displacing this foam layer by blowing air onto the surface. When such a displacement is carried out, it is advantageous to pulse the air current. It also advantageous to provide a nozzle where the air beam impinges perpendicularly to the surface of the liquid to provide free access for the mixing element.

When the foam layer is displaced, the mixing element further approaches the surface of the liquid to detect the actual surface of the liquid. The mixing element is then moved away from the surface by the given distance and gas is blown onto the surface from additional nozzles.

The methods described can be combined with the method for detecting mixing. It is possible, for example, to allow a light beam to traverse the liquid and to evaluate the constancy of a measurement, e.g. light absorption, as a criterion for a finished mixing procedure.

The system of the invention can also be coupled to a device for releasing liquids, such as a pipetting device. A particularly favorable combination is achieved when a pipetting device is integrated in the mixing element.

The invention further comprises a system for mixing a liquid with at least one other liquid or at least one solid material. The system comprises the following elements:

- a vessel which contains the substances to be mixed and has at least one opening
- a mixing element with at least one opening through which a gas beam can emerge
- a detection device for detecting an interface
- a device for moving a mixing element in at least one spatial direction
- a control unit to control the movement of the mixing element and the gas emerging from the mixing element based on the signals generated by the detection device and following a flowchart.

The vessel as understood in the invention has at least one opening. Cuvettes, reagent glasses, spotting plates and the like are suitable in accordance with the invention. In accordance with the invention, the size of the vessels is such that the mixing element and/or the detection device can be partly introduced into the vessel. Cylindrical vessels are particularly preferred.

A mixing element as understood in the invention has at least one outlet opening for a gas beam. In a preferred manner, the mixing element also has other outlet openings or nozzles. A nozzle is not necessarily meant to be a conically reduced outlet opening, but also refers to openings with a constant diameter. Since analysis instruments are usually cylindrical analysis vessels, a mixing element in accordance with the invention also has an essentially cylindrically shape with a diameter that is smaller than the one of the analysis vessel. The nozzles of the mixing element are preferably on the side of the mixing element which faces the liquid. The nozzles may be tilted toward the axis of the mixing element and/or have tangentially disposed components toward the axis of the mixing element. It is advantageous to have several nozzles, preferably three, which are located on the same level on the mixing element. It is also advantageous if additional nozzles are located on a ring which is further away from the surface than the first set of the nozzles. With this arrangement it is possible to block the gas flow in the analysis vessel which suppresses the release of droplets from the liquid. To achieve a rotation of the air stream, the part of the mixing element which faces the analysis vessel can also be a rotary element. In a particularly preferred arrangement, a nozzle is rigidly disposed under a tangential angle of 45° and above the nozzle, there is a ring comprising 8 nozzles which are axially disposed at an angle of 45°. The preferred diameter of the nozzles is between 0.3 and 0.7 mm, particularly preferred 0.4 to 0.6 mm. Preferred volume flows range between 4 and 11 liters per minute.

The invention proposes that the mixing element be coupled to a detection device. In a particularly preferred manner, the mixing element is described such that it can also serve as a detection device. A mixing element as described above, can for example be made of a metal cylinder which has a nozzle arrangement and is surrounded by an insulating layer which in turn is surrounded by a conducting metal layer. Such an arrangement is suitable for the conductometric and capacitative detection of liquids. It is, of course, also possible to spatially separate the electrical poles from one another. The mixing element can be switched to function as one pole, for example, and a second electrical conductor can be separately incorporated in the vessel. Capacitance measuring has the advantage that only one pole is brought into contact with the liquid.

With the above detection devices it is possible to detect liquid or foam even with minimum contact given, so that immersion of die detector is also reduced to a minimum. Carry-over can be minimized by selecting a suitable detector tip, e.g. a teflon-coated tip. To minimized immersion of the detector, it is also advantageous to continuously evaluate the detector signals with the corresponding control of the detector movement.

The mixing element can be moved towards the surface of the liquid with devices known in prior art, for example a spindle drive. It is preferred to use stepping motors as it is relatively easy to control these motors with a computer.

BRIEF DESCRIPTION OF THE DRAWINGS

The following figures further illustrate the invention, wherein

FIG. 1 is the diagrammatic representation of a system (1) of the invention for mixing liquids which is based on capacitance measuring. Mixing element (2) serves as a first pole of the measurement arrangement, whereas the second pole (3) is outside the wall of vessel (4). Contact of the tip (5) of the mixing element (2) with the surface of the liquid leads to a change in the capacitance between mixing element (2) and second pole (3) which is then processed by the evaluation and control device (6). This evaluation and control device (6) controls motor (7) and pump (8). Motor (7) moves the mixing element (2) relative to the surface of the liquid (9) with the aid of a toothed rack. Pump (8) serves to press air into a tubular system (10) of the mixing element (2). The air emerges from the mixing element through a nozzle (11) which is tilted by approximately 40° with respect to the surface of the liquid.

Figure 1:
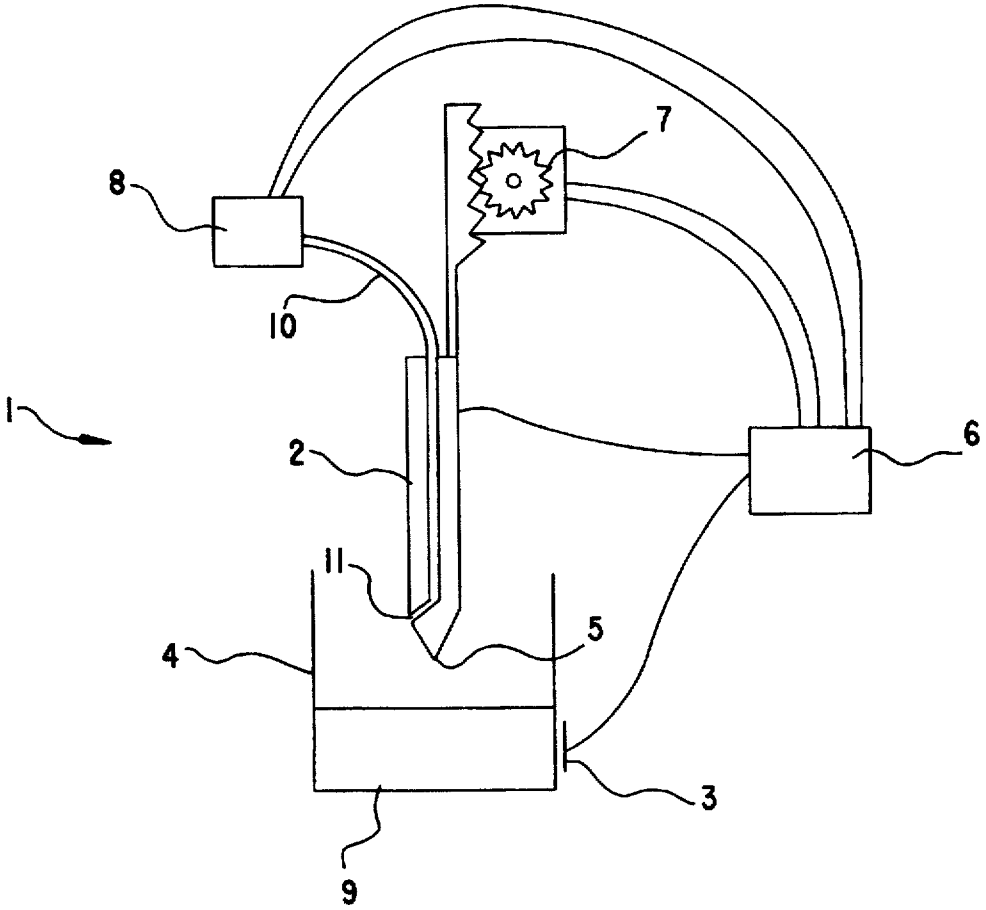
FIG. 1. diagrammatic representation of a system for mixing liquids

An example of the operating sequence of the mixing procedure can in simple turns be summarized as follows:

First, mixing element (2) is in a initial position above the liquid. The evaluation and control device activates pump (8) to generate a weak current of air. Activated by motor (7), mixing element (2) slowly moves toward the surface of the liquid. This movement is stopped as soon as the capacitative liquid detection indicates a contact of tip (5) of the mixing element with the surface of the liquid. Mixing element (2) is then moved away from the surface of the liquid by 2 mm and pump (8) is activated such that a volume flow of 5 l/min passes through nozzle (11).

Figure 2A:
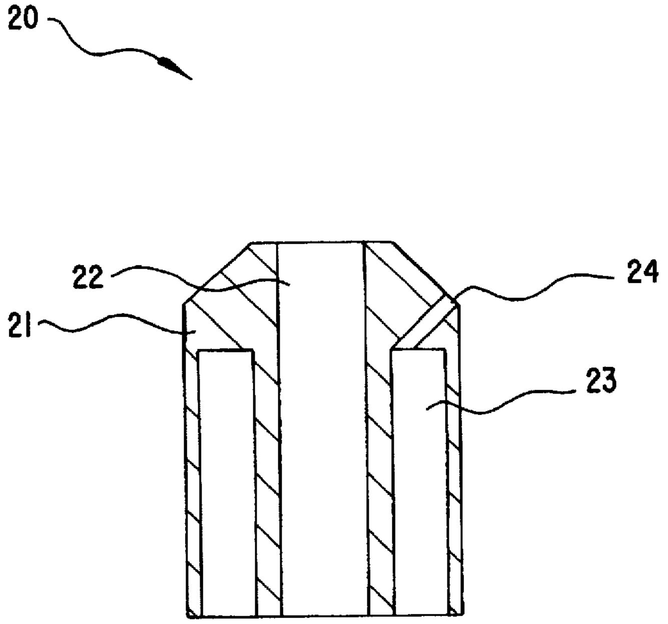
FIGS. 2A and 2B technical drawing showing mixing elements.

FIG. 2A is a longitudinal section across mixing element (20). Metal body (21) of mixing element (20) has an internal tube (22) whose opening is disposed perpendicularly to the longitudinal axis of the mixing element. This internal tube (22) is provided to blow away foam. Ming element (20) has an intake pipe (23) which ends in a nozzle (24). Nozzle (24) and longitudinal axis of the mixing element form an angle of 45°. Air emerging from nozzle (24) then serves to mix liquids.

Figure 2B:
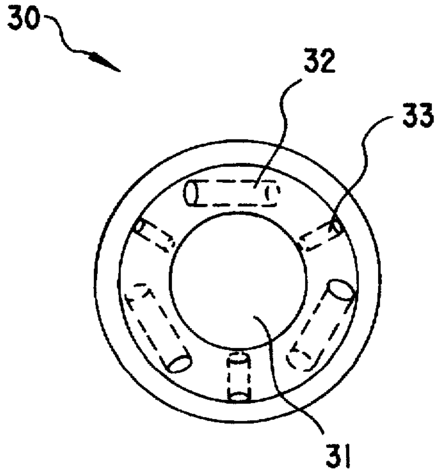
Figure 3:
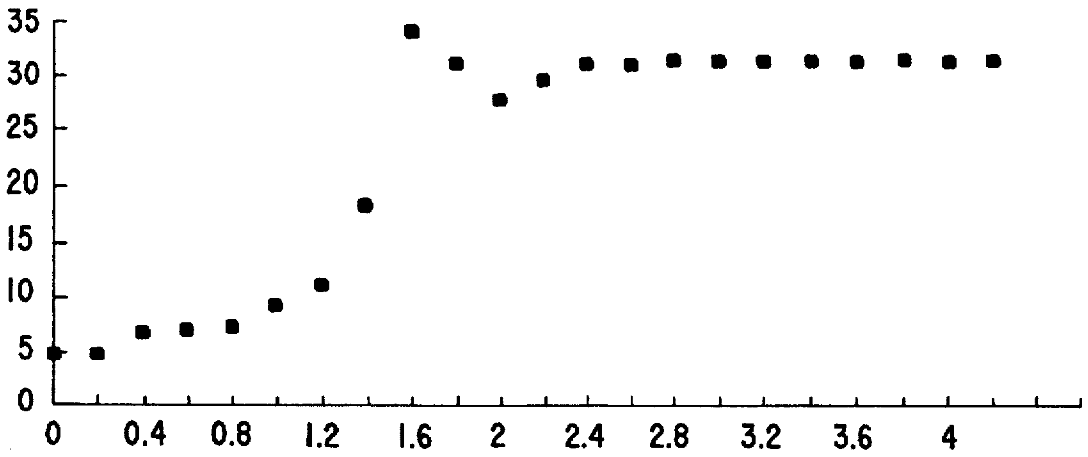
FIG. 3. time interval of a mixing procedure.

FIG. 2B is a cross-section of a mixing element (30) with tangentially arranged nozzles. In the center of the drawing, there is a longitudinal pipe (31) to blow away foam. This longitudinal pipe (31) is surrounded by nozzles, with three nozzles being disposed on each of the two levels of the longitudinal axis. Tangential nozzles (32) of the first set are tilted with respect to the longitudinal axis of the mixing element, i.e. gas emerging from the tangential nozzles (32) impinges on the surface of the liquid under an angle with respect to the surface normal. A second set of nozzles (33) is further away from the tip of the mixing element than the opening of the internal tube 22 and the openings of each of said second set of nozzles lie in a plane which is essentially parallel to the longitudinal axis of the mixing element. The gas emerging from these nozzles creates a backup pressure in the mixing vessel to suppress waste of liquid during the mixing procedure. FIG. 3 shows the time interval necessary to carry out a mixing procedure. 10 µl of ink were placed into a cylindrical analysis vessel (diameter 1 cm, height 4 cm) and covered with 1000 µl of water. The mixing was carried out with a mixing element having three tangential bores (diameter 0.5 mm) and spaced 6 mm apart from the surface of the liquid, and with a volume flow of 8.4 l/min. A photodiode and a receiver, disposed 9 mm above the bottom of the vessel, were used to carry out a colorimetric measurement. In FIG. 3, the operating time of the mixing element is plotted on the abscissa and the resulting coloration of the liquid on the ordinate. In the graph it can be easily seen that complete mixing was achieved after 2.5 sec.

Figure 4:
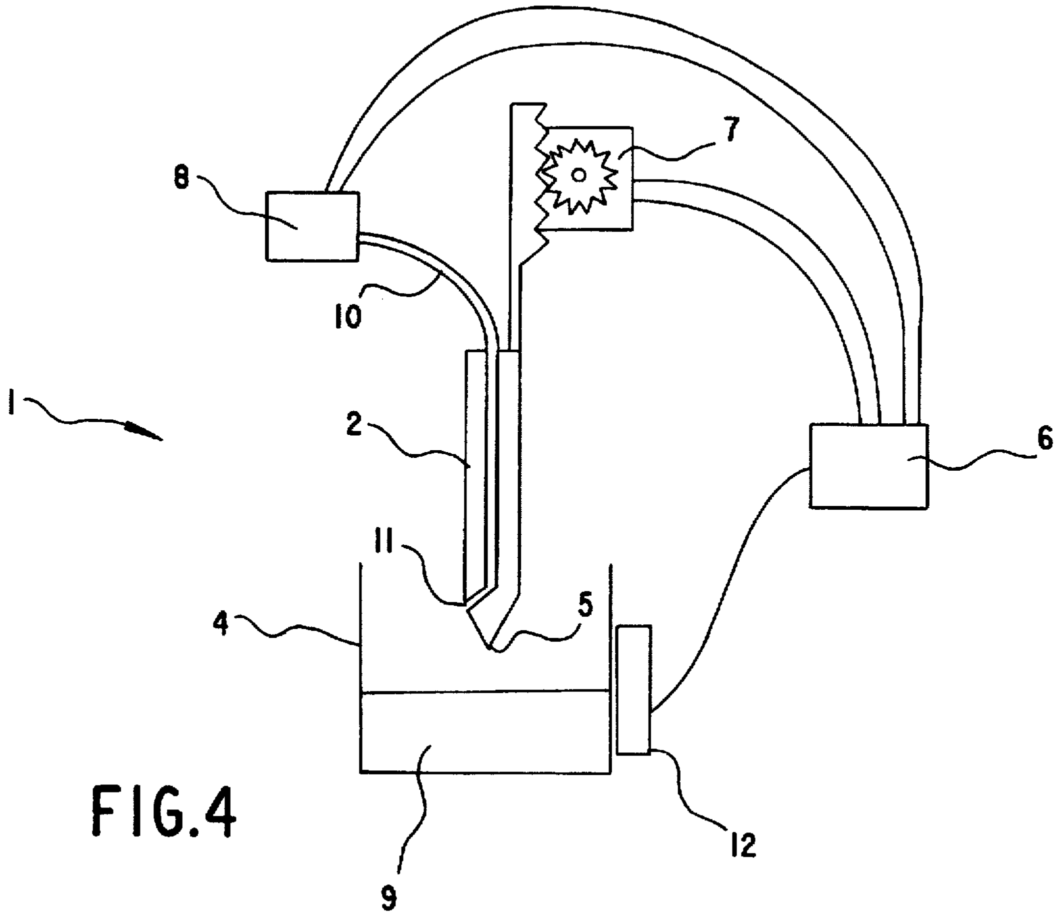
FIG. 4. A diagrammatic representation of a system for mixing liquids using optical detection to detect a distance between a liquid surface and the mixing element and a liquid level in the vessel.

FIG. 4 is a representation of the mixing apparatus in which an optical detection means (12) is used to detect a distance between a liquid surface and the mixing element and a liquid level in the vessel.

As used in the present specification, the terms "gas beam" and "gas jet" are synonymous.

List of Reference Numerals (1) system
(2) mixing element
(3) second pole
(4) vessel
(5) tip of mixing element
(6) evaluation and control device
(7) motor
(8) pump
(9) liquid
(10) tubular system
(11) nozzle
(20) mixing element
(21) metal body
(22) internal tube
(23) feeding pipe
(24) nozzle
(30) mixing element
(31) longitudinal pipe
(32) tangential nozzle
(33) vertical nozzle

We claim:

1. A method of mixing a liquid with at least one other liquid or solid material in a vessel comprising:

a. moving the mixing element in a direction toward a liquid surface, wherein said mixing element has at least one gas jet opening therein for supplying a gas to the liquid surface, b. detecting a distance between the mixing element and the liquid surface, c. terminating the movement of the mixing element when a predetermined distance between the mixing element and the liquid surface has been reached, wherein a distance between the mixing element and the liquid surface is determined by a detection means disposed outside of said vessel, and d. blowing a gas onto the surface of the liquid at said predetermined distance through said at least one gas jet opening of the mixing element to cause the liquid to move thereby mixing the liquid in said vessel, wherein the liquid surface in the vessel is detected from outside the vessel, and the distance between the mixing element and the liquid surface is determined by accounting for a position of the mixing element relative to the liquid surface.

2. The method of claim 1, wherein the predetermined distance between the mixing element and the liquid surface is about 3 to about 6.5 mm.

3. The method of claim 1, further including a step of measuring the mixing of the liquid by an optical detection means.

4. The method of claim 1, further including a step, prior to the step of blowing gas onto the surface of the liquid to cause the liquid to move, of blowing a gas onto the surface of the liquid to displace any foam or other substances which may be present on the liquid surface.

5. The method of claim 1, said method comprising a first step of providing the mixing element having a longitudinal axis, the mixing element further including at least one first nozzle having an opening lying in a plane which is essentially perpendicular to the longitudinal axis of the mixing element, and at least one second nozzle having an opening which is disposed at an angle with respect to the longitudinal axis of the mixing element.

6. The method of claim 4, wherein said step of providing the mixing element includes providing the mixing element with a set of third nozzles having openings, each opening being in a plane which is essentially parallel to the longitudinal axis of the mixing element, with the set of third nozzles being further away from a tip of the mixing element than the first nozzle.

7. An apparatus for mixing a liquid with at least one other liquid or solid material, said apparatus comprising:

a vessel for containing the liquid therein, said vessel having an access opening therein;

a mixing element having an outer surface with at least one opening therein, said at least one opening enabling gas to travel therethrough;

an optical detection means coupled to the mixing element for detecting a distance between a liquid surface and the mixing element and for detecting a liquid level in the vessel, wherein said optical detection means is disposed outside of said vessel;

- a moving means coupled to the mixing element for moving the mixing element in at least one direction to a predetermined distance;
- a gas supply means for supplying the gas to the mixing element, thereby providing a gas jet from the at least one opening in the mixing element, wherein the gas jet blows the gas onto the liquid surface when the mixing element is at the predetermined distance to cause the liquid to move, thereby mixing the liquid; and
- an evaluation and control means coupled to said optical detection means and said moving means for controlling the moving means to move the mixing element and to control the gas jet based upon signals generated by the optical detection means.

8. The apparatus of claim 7, wherein said mixing element comprises a longitudinal axis and a plurality of openings including at least one first nozzle having a first opening lying in a plane which is essentially perpendicular to the longitudinal axis of the mixing element, and at least one second nozzle having a second opening which is disposed at an angle with respect to the longitudinal axis of the mixing element.

9. The apparatus of claim 8, wherein said mixing element further comprises a set of third nozzles each having third openings therein, with each opening of the third nozzles being disposed on a plane which is essentially parallel to the longitudinal axis of the mixing element, with the set of third nozzles being further away from a tip of the mixing element than the first nozzle.

* * * * *